US012687839B2

(12) United States Patent
Hong et al.

(10) Patent No.: US 12,687,839 B2
(45) Date of Patent: Jul. 21, 2026

(54) CHEMICAL STORAGE CONTAINER MANAGEMENT SYSTEM FOR SEMICONDUCTOR PROCESS USING SHORT-RANGE WIRELESS COMMUNICATION

(71) Applicant: SEMICON TECH GLOBAL LIMITED, Seongnam-si (KR)

(72) Inventors: Soon Suk Hong, Seongnam-si (KR); Sun Seock Moon, Yongin-si (KR); Kwon Su Kim, Hwaseong-si (KR); Se Hyun Jang, Yongin-si (KR)

(73) Assignee: SEMICON TECH GLOBAL LIMITED, Seongnam-si (KR)

( * ) Notice: Subject to any disclaimer, the term of this patent is extended or adjusted under 35 U.S.C. 154(b) by 459 days.

(21) Appl. No.: 18/540,893

(22) Filed: Dec. 15, 2023

(65) Prior Publication Data

US 2025/0013224 A1      Jan. 9, 2025

(30) Foreign Application Priority Data

Jul. 3, 2023      (KR) ......................... 10-2023-0085808

(51) Int. Cl.
G05B 19/416      (2006.01)
G05B 19/406      (2006.01)
G06K 19/07      (2006.01)
G08B 21/18      (2006.01)

(52) U.S. Cl.
CPC ......... *G05B 19/416* (2013.01); *G05B 19/406* (2013.01); *G06K 19/0723* (2013.01); *G08B 21/18* (2013.01); *G05B 2219/37371* (2013.01)

(58) Field of Classification Search
CPC ............... G05B 19/416; G05B 19/406; G06K 19/0723; G08B 21/18; G03F 7/16; G03F 7/20; H10P 72/0448; H10P 72/0604; B05C 19/06; B05C 11/1005; H04W 4/04; H04W 4/005; H04W 4/08
See application file for complete search history.

(56) References Cited

U.S. PATENT DOCUMENTS

| | | | | |
|---|---|---|---|---|
| 8,398,813 | B2 * | 3/2013 | Kobayashi | ............... H10P 70/15 |
| | | | | 156/345.31 |
| 2010/0233884 | A1 * | 9/2010 | Lung | ................... H10P 72/0448 |
| | | | | 118/620 |
| 2020/0290080 | A1 * | 9/2020 | Naitou | .................... B05C 19/06 |

FOREIGN PATENT DOCUMENTS

KR      10-2014-0047636  A      4/2014

* cited by examiner

*Primary Examiner* — Vernal U Brown
(74) *Attorney, Agent, or Firm* — Revolution IP, PLLC

(57) ABSTRACT

A chemical storage container management system for a semiconductor process using short-range wireless communication includes: a chemical supply assembly supplying a chemical accommodated in a chemical storage container accommodating the chemical used for the semiconductor process to a region in which the semiconductor process is performed, and generating a plurality of information related to the chemical storage container; and a monitoring management unit receiving the plurality of information generated by the chemical supply assembly, and determining an operation situation of the chemical supply assembly.

9 Claims, 12 Drawing Sheets

(a)                    (b)

CHEMICAL STORAGE CONTAINER MANAGEMENT SYSTEM FOR SEMICONDUCTOR PROCESS USING SHORT-RANGE WIRELESS COMMUNICATION

CROSS-REFERENCE TO RELATED APPLICATION

This application claims under 35 U.S.C. § 119 (a) the benefit of Korean Patent Application No. 10-2023-0085808 filed on Jul. 3, 2023, the entire contents of which are incorporated herein by reference.

BACKGROUND

(a) Technical Field

The present invention relates to a chemical storage container management system for a semiconductor process, and more particularly, to a system which can more effectively manage and monitor a chemical storage container for a semiconductor process by utilizing short-range wireless communication.

(b) Background Art

In general, a photolithography process includes a process of locating a wafer for which a series of semiconductor manufacturing processes are preceded on a spin chuck of a coating device, and coating a photoresist.

Here, the photoresist is configured to include an inhibitor as a sensitive agent that is activated by a resin and light and a liquid-state solvent.

In addition, the photoresist can be supplied to a photoresist supply line through a photoresist supply pipe (Teflon tube) coupled to a container cap in a state of being accommodated in a container made of a glass bottle, and the photoresist supplied to the photoresist supply line can be supplied to the coating device via multiple valves and an intermediate tank.

Further, in the photolithography process, concentration, pollution, and other quality requirements of the photoresist are confirmed in order to fill an exact amount of photoresist in the container, and after the photoresist is filled in the container, the container accommodating the photoresist is connected to a chemical supply device provided in a semiconductor manufacturing equipment.

However, in the process of installing the container, a cap may be mixed and incorrectly mounted on another container or the container may not be accurately settled at a correct position due to a mistake of an operator.

In this case, as all processes conducted in the facility are stopped, a very large loss may be generated, and a pre-manufactured product may also be discarded due to the supply of an inappropriate chemical.

Therefore, a method for solving the problems is required.

PRIOR ART DOCUMENT

[Patent Document]
Korean Laid-open Patent Publication No. 10-2014-0047636

SUMMARY OF THE DISCLOSURE

The present invention is devised to solve the aforementioned problem in the related art, and has an object to identify a movement path of a chemical storage container storing a chemical used in a semiconductor process, and automatically determine an expiration date and disposal of the chemical storage container while preventing mixing of a nozzle to perform effective semiconductor process management.

The problems of the present invention are not limited to the problems described above, and other objects, which are not described above, will be clearly understood by those skilled in the art from the following description.

In order to achieve the object, a chemical storage container management system for a semiconductor process using short-range wireless communication according to the present invention includes: a chemical supply assembly supplying a chemical accommodated in a chemical storage container accommodating the chemical used for the semiconductor process to a region in which the semiconductor process is performed, and generating a plurality of information related to the chemical storage container; and a monitoring management unit receiving the plurality of information generated by the chemical supply assembly, and determining an operation situation of the chemical supply assembly, wherein the chemical supply assembly includes a nozzle mounting unit provided detachably on the chemical storage container, and including a nozzle identification tag storing nozzle related information of the chemical storage container; a container settlement unit provided so as to settle the chemical storage container therein, and acquiring container settlement information indicating whether the chemical storage container is settled and container related information from a container identification tag pre-mounted on the chemical storage container through short-range wireless communication; and a nozzle information acquisition unit acquiring the nozzle related information from the nozzle identification tag and transmitting the nozzle related information to the container settlement unit through the short-range wireless communication.

In this case, the nozzle mounting unit includes a first nozzle mounting part covering at least a partial circumference of the chemical storage container and having the nozzle identification tag, and a second nozzle mounting part coupled to the first nozzle mounting part in a form to cover the remaining circumference of the chemical storage container.

In addition, the container settlement unit may include a container holder having a settlement space on which the settlement storage container is settled therein, and a communication board provided in the container holder, generating container settlement information as recognizing whether the chemical storage container is positioned in the settlement space, acquiring the container related information and the nozzle related information, and transmitting the acquired information to the monitoring management unit.

Further, the nozzle information acquisition unit may include an identification antenna identifying the nozzle identification tag, acquiring the nozzle related information, and transmitting the nozzle related information to the container settlement unit, and a fixation bracket fixing the identification antenna.

Meanwhile, the chemical supply assembly may further include a mount frame, a plurality of nozzle information acquisition units and a plurality of container settlement units may be provided in the mount frame to match each other one by one, and the chemical supply assembly may be formed to introduce a plurality of chemical storage containers.

Moreover, the chemical storage container management system for a semiconductor process may further include a gateway distinguishing the container settlement information, the container related information, and the nozzle related information from the plurality of nozzle information acquisition units and the plurality of container settlement units and individually transmitting the distinguished information to the monitoring management unit, and distinguishing wireless communication host protocol information generated by the monitoring management unit and individually transmitting the wireless communication host protocol information to the plurality of nozzle information acquisition units and the plurality of container settlement units.

Further, the chemical storage container management system for a semiconductor process may further include a pre-checker terminal receiving the container settlement information, and monitoring a current status and an error occurrence situation for a process of loading/unloading the chemical storage container on/from the container settlement unit.

In this case, the pre-checker terminal may include an alarm unit generating an alarm in the process of loading/unloading the chemical storage container on/from the container settlement unit by receiving the container settlement information.

Moreover, the chemical storage container management system for a semiconductor process may further include a sound generation apparatus performing an alarm by regenerating a sound by a control command of the monitoring management unit when the monitoring management unit determines that a predetermined error situation occurs with respect to the chemical supply assembly.

In order to solve the problem, in the chemical storage container management system for the semiconductor process utilizing the short-range wireless communication according to the present invention, as a monitoring management unit receives and utilizes nozzle related information, container settlement information, and container related information generated from each of a nozzle mounting unit mounted on a chemical storage container and a container settlement unit on which the chemical storage container is settled and collected by the short-range wireless communication, it has an advantage in that effective semiconductor process management can be performed.

In particular, according to the present invention, the monitoring management unit identifies a movement path of the chemical storage container, automatically determines an expiration date and disposal of the chemical storage container while preventing mixing of a nozzle cap, and fundamentally removes a process failure cause to significantly reduce total cost in a process operation process, and enhance productivity.

The effects of the present invention are not limited to the aforementioned effect, and other effects, which are not mentioned above, will be apparent to a person having ordinary skill in the art from the description of the claims.

DETAILED DESCRIPTION

Figure 1:
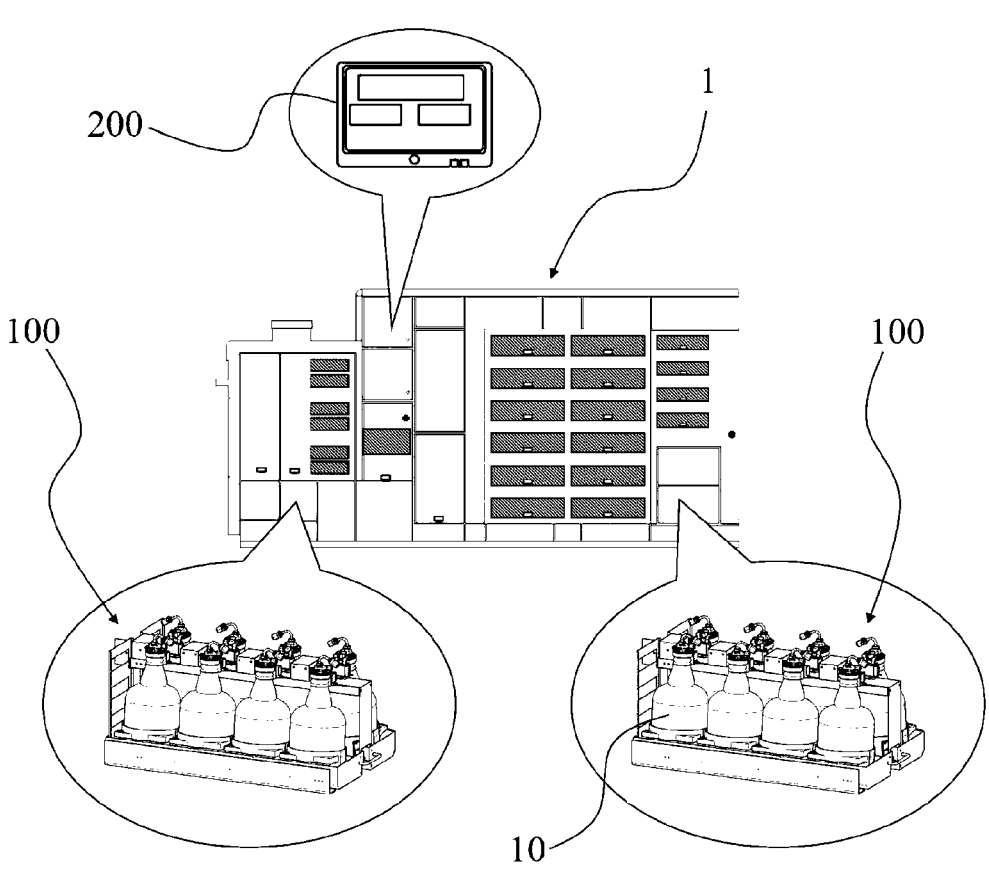
FIG. 1 is a diagram illustrating a wafer processing apparatus to which a chemical storage container management system for a semiconductor process according to a first embodiment of the present invention.

In this specification, if a component (or region, layer, part, etc.) is mentioned as being "exist on", connected to", or "coupled to", it means that the component may be directly placed/connected/coupled to another component, or a third component may be placed therebetween.

Like reference numeral refers to like component. In addition, in the drawings, the thickness, ratio, and dimensions of the components are exaggerated for the effective explanation of the technical content.

The terms "and/or" include one or more all combinations which may be defined by associated components.

The terms including as first, second, and the like are used for describing various components, but the components should not be limited by the terms. The terms are used only to discriminate one component from another component. For example, a first component may be referred to as a second component, and similarly, the second component may be referred to as the first component without departing from the scope of the present invention. A singular form includes a plural form unless the context clearly dictates otherwise.

Further, the terms such as "below", "beneath", "above", and "on" are used for describing a correlation between components illustrated in the drawings. The terms as relative concepts are described based on a direction indicated in the drawings.

Unless defined differently, all the terms used herein (including technical terms and scientific terms) have the same meaning as commonly understood by those skilled in the art to which the present invention pertains. Further, it should be construed that the terms such as terms defined in a dictionary generally used have meanings which coincide with meanings in a context of related art, and unless the terms are construed as ideal or excessively formal meanings, the terms are explicitly defined herein.

It should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Hereinafter, the embodiments of the present invention will be described in detail with reference to the drawings.

FIG. 1 is a diagram illustrating a wafer processing apparatus 1 to which a chemical storage container management system for a semiconductor process according to a first embodiment of the present invention.

The wafer processing apparatus 100 illustrated in FIG. 1 may include various components for processing a wafer.

For example, the wafer processing apparatus 1 may include a plurality of process regions in which various processing process including cutting, polishing, etching, coating, etc., of the wafer are conducted.

Even among them, in the embodiment, the wafer processing apparatus 1 may include a process region of coating a photoresist on the wafer, and as a result, one or more chemical supply assemblies 100 for supplying a chemical such as the photoresist to the wafer may be provided inside the wafer processing apparatus 1.

In addition, the wafer processing apparatus 1 may include a monitoring management unit 200 that determines an operation situation of the chemical supply assembly 100 jointly with the chemical supply assembly 100, and the chemical supply assembly 100 and the monitoring management unit 200 jointly constitute the chemical storage container management system for a semiconductor process.

Hereinafter, the chemical storage container management system for a semiconductor process according to the present invention will be described in detail.

Figure 2:
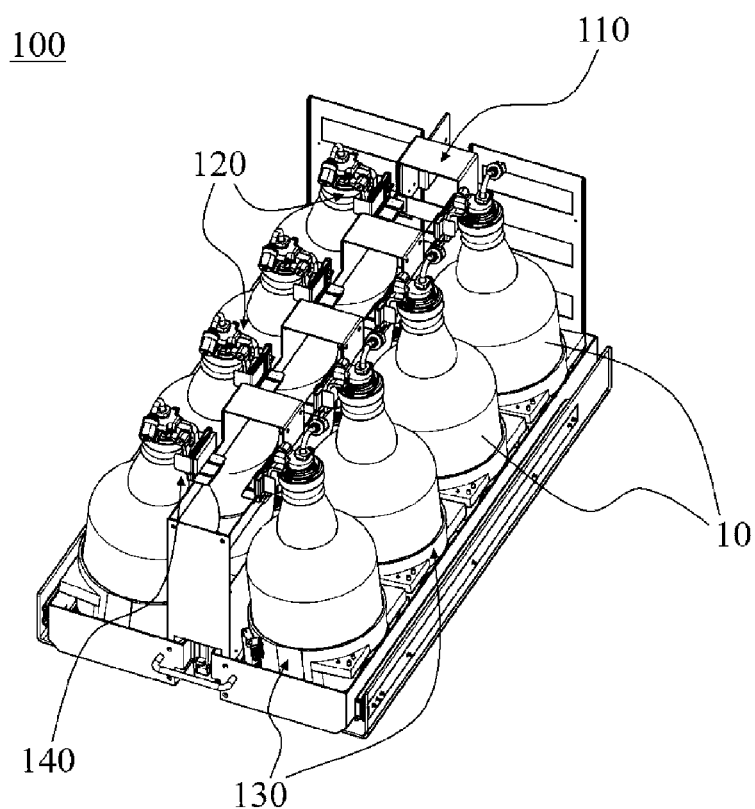
FIG. 2 is a diagram illustrating a chemical supply assembly in the chemical storage container management system for a semiconductor process according to the first embodiment of the present invention.
Figure 3:
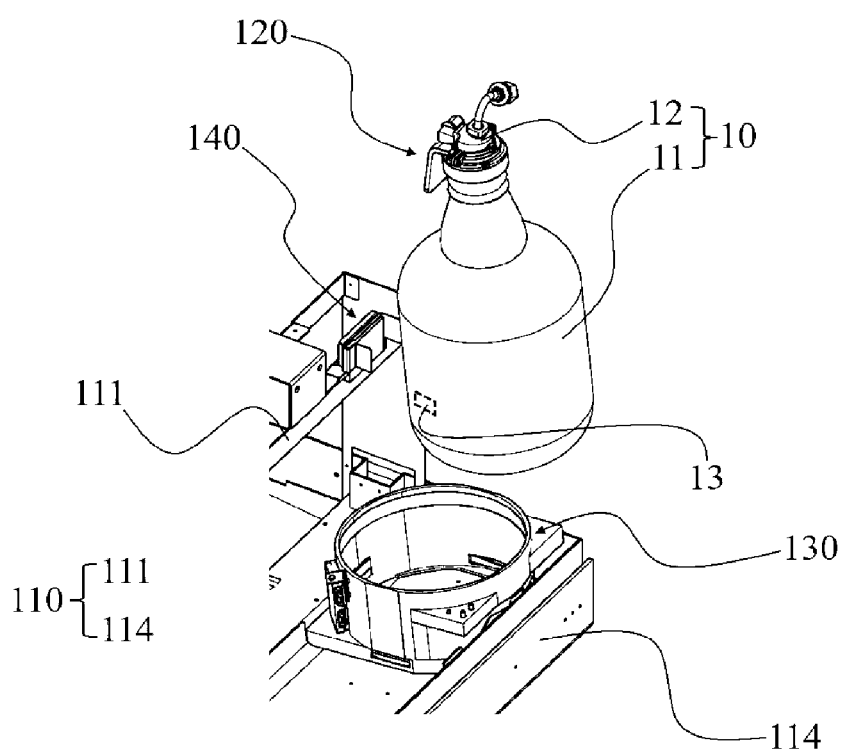
FIG. 3 is a diagram illustrating a case where a chemical storage container is settled on the chemical supply assembly in the chemical storage container management system for a semiconductor process according to the first embodiment of the present invention.

FIG. 2 is a diagram illustrating a chemical supply assembly 100 in the chemical storage container management system for a semiconductor process according to the first embodiment of the present invention and FIG. 3 is a diagram illustrating a case where a chemical storage container 10 is settled on the chemical supply assembly 100 in the chemical storage container management system for a semiconductor process according to the first embodiment of the present invention.

As illustrated in FIGS. 2 and 3, in the embodiment, the chemical supply assembly 100 serves to supply a chemical accommodated in the chemical storage container 10 to a region where a semiconductor process is performed, and in detail, includes a nozzle mounting unit 120, a container settlement unit 130, a nozzle information acquisition unit 140, and a mount frame 110.

In the embodiment, the chemical storage container 10 has a form including a chemical storage body 11 accommodating the chemical and a nozzle cap 12 detachably provided at an upper portion of the chemical storage body 11 and serving to supply the chemical accommodated in the chemical storage body 11 to the process region.

The nozzle mounting unit 120 is detachably provided in the chemical storage container 10, and includes a nozzle identification tag storing nozzle related information of the chemical storage container 10.

In addition, in the embodiment, it is described that the nozzle mounting unit 120 is mounted adjacent to the nozzle cap 12 of the chemical storage container 10, but this is not limited to the embodiment.

The container settlement unit 130 is provided to settle the chemical storage container 10 therein to acquire container settlement information representing whether the chemical storage container 10 is settled and container related information from a container identification tag 13 previously mounted on the chemical storage container 10 through short-range wireless communication.

In the case of the embodiment, it is assumed that the container identification tag 13 is provided at the chemical storage body 11 part of the chemical storage container 10, and the container settlement unit 130 identifies the container identification tag 13 of the chemical storage container 10 settled therein.

In this case, a wireless communication scheme applied between the container settlement unit 130 and the container identification tag 13 may be radio frequency identification (RFID), but is not limited thereto, and may adopt various wireless communication schemes such as Bluetooth, Zigbee, WiFi, Ultra-Wideband (UWB), etc.

The nozzle information acquisition unit 140 serves to acquire the nozzle related information from the nozzle identification tag of the nozzle mounting unit 130 through the short-range wireless communication, and transmit the acquired nozzle related information to the container settlement unit 130.

In the embodiment, the wireless communication scheme applied between the nozzle information acquisition unit 140 and the nozzle identification tag may similarly be the RFID, and moreover, may adopt various wireless communication schemes listed above, of course.

Further, a data transmission process between the nozzle information acquisition unit 140 and the container settlement unit 130 may also be any one of the wireless communication schemes listed above, or may also be a wired communication scheme.

The mount frame 110 provides a basic backbone structure for installing the container settlement unit 130 and the nozzle information acquisition unit 140.

In the embodiment, a plurality of nozzle information acquisition units 140 and container settlement units 130 are provided to match each other one by one, so the chemical supply assembly 100 may be formed to introduce a plurality of chemical storage containers 10.

In addition, the mount frame 110 is formed in a form including a lower frame 114 with a plurality of container installation regions partitioned from each other so that a plurality of container settlement units 130 may be installed and an upper frame 111 connected to the lower frame 114 and provided to install the plurality of nozzle information acquisition units 140.

In particular, in the embodiment, the lower frame 114 is disposed so that the plurality of container installation regions are placed to be symmetric to each other around the upper frame 111, and the upper frame 111 is disposed so that the plurality of nozzle information acquisition units 140 are placed to be symmetric to each other.

However, the form of the mount frame 110 may be variously designed and changed in forms other than the form of the embodiment, of course.

Hereinafter, detailed structures of the nozzle mounting unit 120, the container settlement unit 130, and the nozzle information acquisition unit 140 will be described in more detail.

Figure 4:
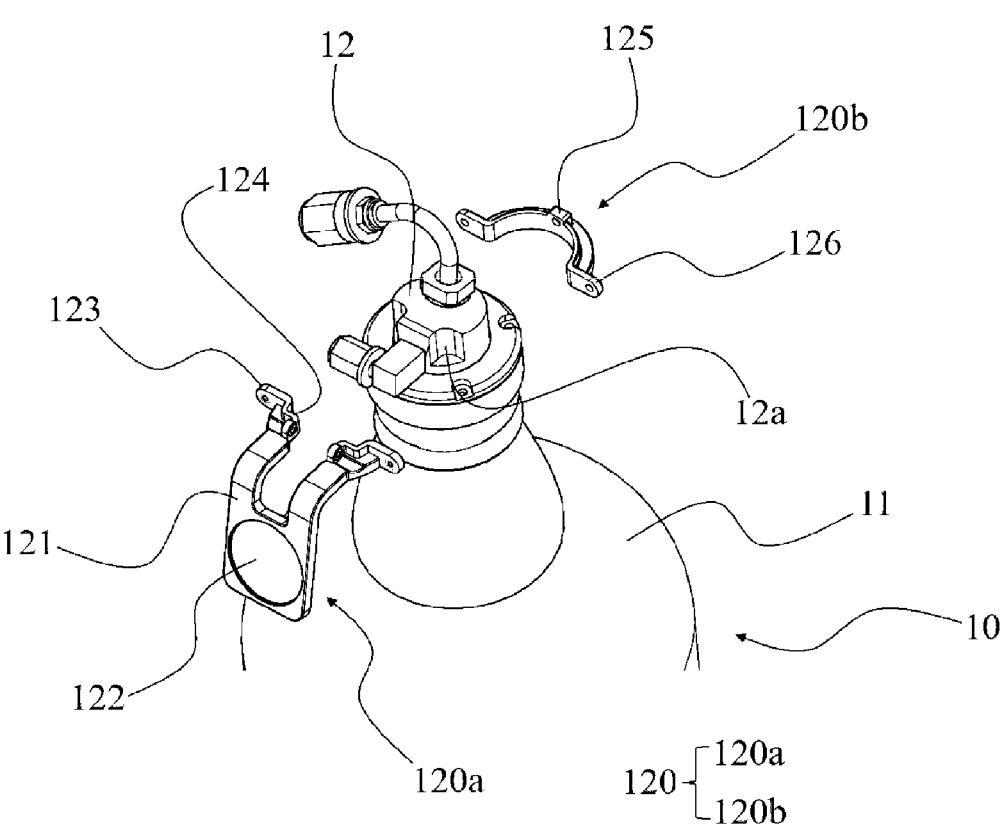
FIG. 4 is a diagram illustrating a structure of a nozzle mounting unit in the chemical storage container management system for a semiconductor process according to the first embodiment of the present invention.

FIG. 4 is a diagram illustrating a structure of a nozzle mounting unit 120 in the chemical storage container management system for a semiconductor process according to the first embodiment of the present invention.

As illustrated in FIG. 4, in the embodiment, the nozzle mounting unit 120 includes a first nozzle mounting part 120a and a second nozzle mounting part 120b.

The first nozzle mounting part 120a covers at least a partial circumference of the chemical storage container 10 and includes the nozzle identification tag 122. In this case, the nozzle identification tag 122 stores the nozzle related information which is information related to the nozzle cap 12 of the chemical storage container 10.

In addition, the second nozzle mounting part 120b has a form of being coupled to the first nozzle mounting part 120a in a form of covering the remaining circumference of the chemical storage container 10.

That is, in the nozzle mounting unit 120, the first nozzle mounting part 120a and the second nozzle mounting part 120b may be coupled to the chemical storage container 10 to be detachable from each other.

Further, in the case of the embodiment, the first nozzle mounting part 120a and the second nozzle mounting part 120b are mounted adjacent to the nozzle cap 12 of the chemical storage container 10.

In addition, in the embodiment, the first nozzle mounting part 120a includes, in detail, a tag mouthing portion 121 with the nozzle identification tag 122 and a first coupling portion 123 branched to both sides of the tag mounting portion 121 and formed to be coupled to the second nozzle mounting part 120b.

In this case, a dented settlement groove 12a may be formed at the nozzle cap 12 of the chemical storage container 10, and a settlement jaw 124 inserted into the settlement groove 12a and increasing fixation force may be formed at the first coupling portion 123.

The second nozzle mounting part 120b includes, in detail, a container close contact portion 125 covering the remaining circumference of the chemical storage container 10 at an opposite side to the first nozzle mounting part 120a and a second coupling portion 126 provided at both sides of the container close contact portion 125 and formed to be coupled to the first nozzle mounting part 120a.

Figure 5:
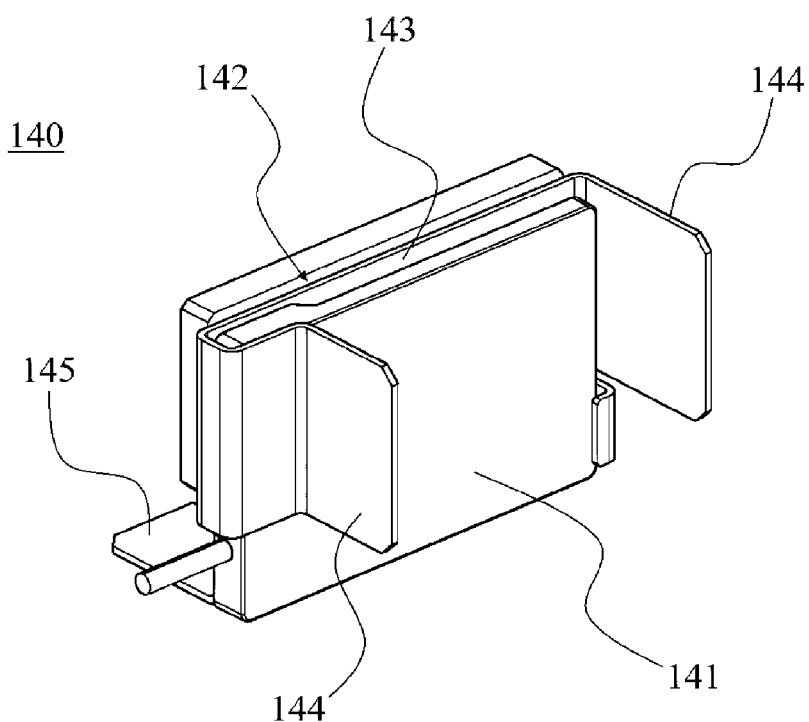
FIG. 5 is a diagram illustrating a structure of a nozzle information acquisition unit in the chemical storage container management system for a semiconductor process according to the first embodiment of the present invention.

FIG. 5 is a diagram illustrating a structure of a nozzle information acquisition unit 140 in the chemical storage container management system for a semiconductor process according to the first embodiment of the present invention.

As illustrated in FIG. 4, in the embodiment, the nozzle information acquisition unit 140 includes an identification antenna 141 and a fixation bracket 142.

The identification antenna 141 is provided to acquire the nozzle related information by identifying the nozzle identification tag 121 of the nozzle mounting unit 120 and transmit the nozzle related information to the container settlement unit 130.

In addition, the fixation bracket 142 serves to fix the identification antenna 141 to the mount frame 110.

In the embodiment, the fixation bracket 142 has a form to include a rear surface fixation portion 143 covering a rear surface of the identification antenna 141, a pair of guide portions 144 extended to a front from both sides of the rear surface fixation portion 143 and having the first nozzle mounting part 120a of the nozzle mounting unit 120 positioned therebetween, and a frame fastening portion 145 extended in a form bent to a rear at a lower end of the rear surface fixation portion 143 and fastened to the mount frame 110.

In this case, a pair of guide portions 144 serves to guide the nozzle identification tag 121 provided in the first nozzle mounting part 120a of the nozzle mounting unit 120 to face the identification antenna 141 in the process of settling the chemical storage container 10 on the container settlement unit 130.

Moreover, at least any one of a pair of guide portions 144 is bent from the rear surface fixation portion 143 in a form of covering a part of a front surface of the identification antenna 141 to stably fix the identification antenna 141.

Further, the identification antenna 141 is formed in a flat plate form to be formed coupled to or separated from an upper portion of the fixation bracket 142.

Figure 6:
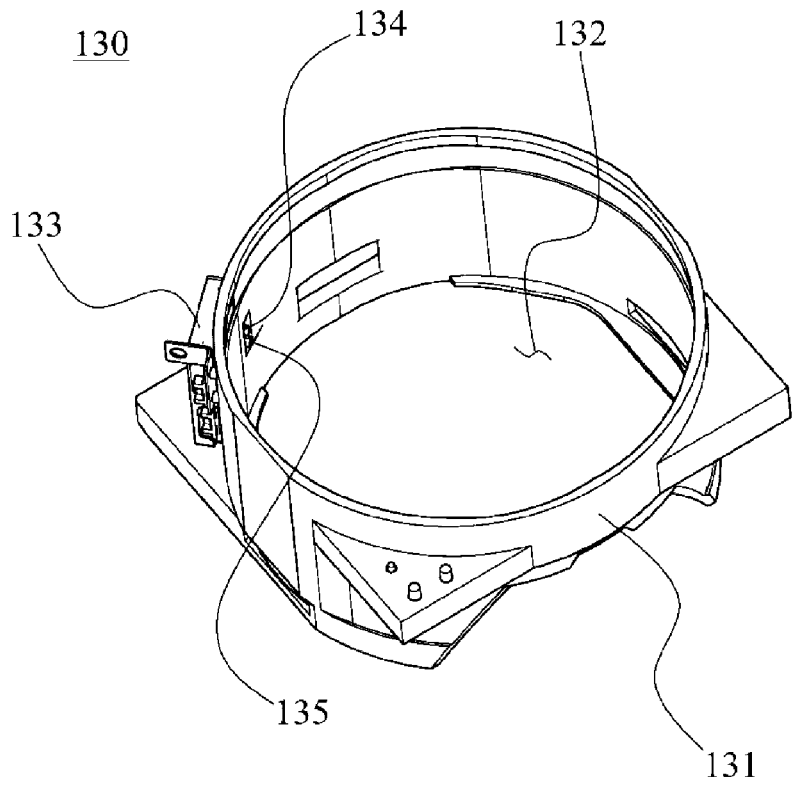
FIG. 6 is a diagram illustrating a structure of a container settlement unit in the chemical storage container management system for a semiconductor process according to the first embodiment of the present invention.

FIG. 6 is a diagram illustrating a structure of a container settlement unit 130 in the chemical storage container management system for a semiconductor process according to the first embodiment of the present invention.

As illustrated in FIG. 6, in the embodiment, the container settlement unit 130 includes a container holder 131 and a communication board 133.

The container holder 131 has a settlement space 132 in which the chemical storage container 10 is settled. In the embodiment, the container holder 131 has a form of covering the circumference of the chemical storage body 11 at a lower portion of the chemical storage container 10 on the whole.

The communication board 133 serves to generate the container settlement information as recognizing that the chemical storage container 10 is provided in the container holder 131 and positioned in the settlement space 132, and further, acquire the container related information and the nozzle related information, and transmit the acquired container related information and nozzle related information to a monitoring management unit 200 (see FIG. 7) to be described below.

In this case, the communication board 133 includes a container sensor 134 exposed to the settlement space 132 in order to sense whether the chemical storage container 10 is positioned in the settlement space 132. Any one among known sensors for sensing an object in a front may be applied as the container sensor 134.

Further, the communication board 133 may include an identification probe 135 exposed to the settlement space 132 in order to acquire the container related information from the container identification tag 13 (see FIG. 3) pre-mounted on the chemical storage container 10 through the short-range wireless communication.

In addition, the communication board 133 may receive the nozzle related information acquired from the identification antenna 141.

That is, the communication board 133 collects the container settlement information, the container related information, and the nozzle related information, and transmits the information to the monitoring management unit 200 to be described below.

Figure 7:
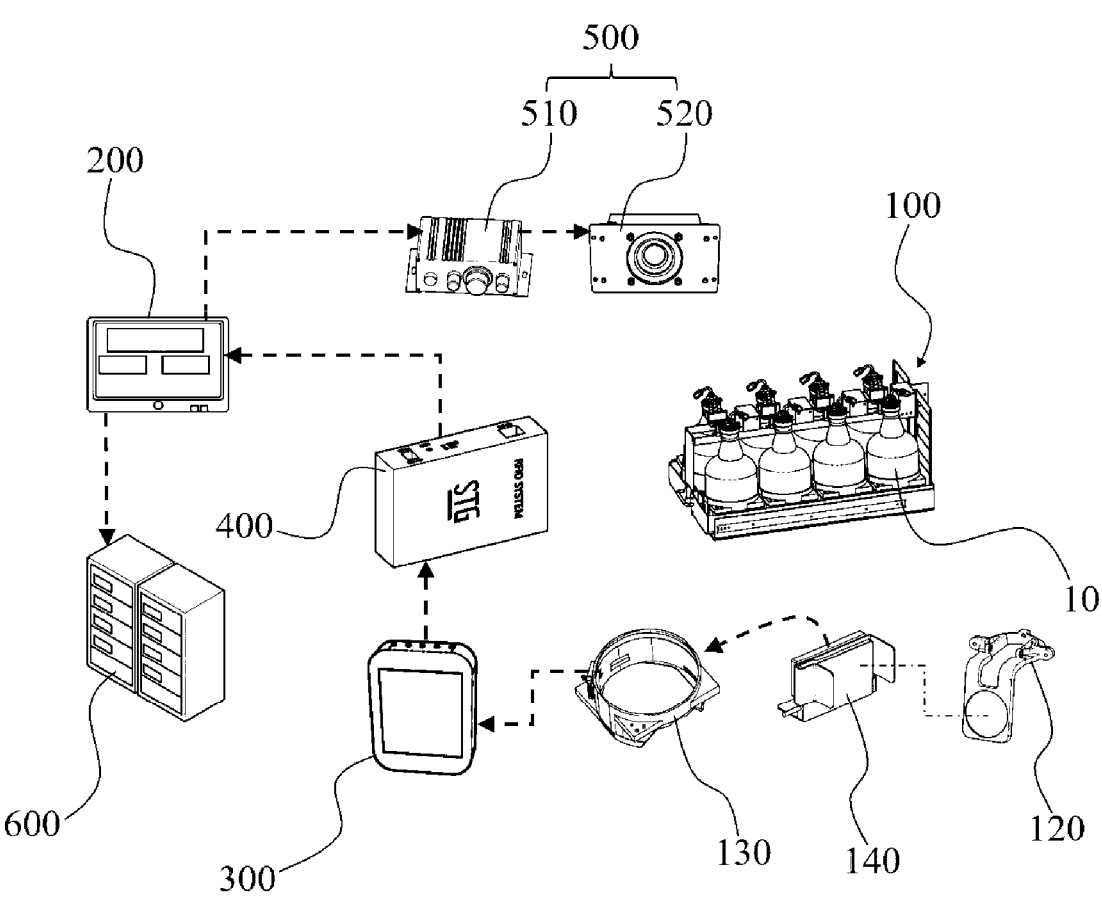
FIG. 7 is a diagram schematically illustrating all components the chemical storage container management system for a semiconductor process according to the first embodiment of the present invention, and a data flow therebetween.

FIG. 7 is a diagram schematically illustrating all components the chemical storage container management system for a semiconductor process according to the first embodiment of the present invention, and a data flow therebetween.

As illustrated in FIG. 7, the container settlement unit 130 of the chemical supply assembly 100 generates the container settlement information and the container related information from the chemical storage container 10, and further, the nozzle information acquisition unit 140 collects the nozzle related information identified by the nozzle mounting unit 120, and the respective information is transmitted to the monitoring management unit 200.

In the embodiment, since the plurality of chemical storage containers 10 are provided in the chemical supply assembly 100, the container settlement information, the container related information, and the nozzle related information corresponding to each chemical storage container 10 may be generated and transmitted to the monitoring management unit 200.

In addition, the monitoring management unit 200 may determine an operation situation of the chemical supply assembly 100 by receiving the container settlement information, the container related information, and the nozzle related information, and all data processed by the monitoring management unit 200 may be stored in the operation server 600.

Moreover, the chemical storage container management system for the semiconductor process according to the embodiment may further include a gateway 400, a pre-checker terminal 300, and a sound generation apparatus 500.

The gateway 400 serves to distinguish a plurality of container settlement information, container related information, and nozzle related information and individually transmit the information to the monitoring management unit 200 in the process in which data is transmitted from the container settlement unit 130 to the monitoring management unit 200, and further, distinguish wireless communication host protocol information generated by the monitoring management unit 200 and individually transmit the wireless communication host protocol information to a plurality of nozzle information acquisition units 140 and a plurality of container settlement units 130.

The pre-checker terminal 300 is provided to receive the container settlement information and monitor a current status and an error occurrence situation for a process of loading/unloading the chemical storage container 10 on/from the container settlement unit 130.

In this case, the pre-checker terminal 300 may include an alarm unit that receives the container settlement information, and generates an alarm through sound or light in the process of loading/unloading the chemical storage container 10 on/from the container settlement unit.

When the monitoring management unit 200 determines that a predetermined error situation occurs for the chemical supply assembly 100, the sound generation apparatus 500 serves to perform the alarm by regenerating the sound by a control command of the monitoring management unit 200.

To this end, the sound generating apparatus 500 according to the embodiment may include an amplifier 510 amplifying a sound signal and a speaker 520 generating the sound.

As described above, the chemical storage container management system for the semiconductor process according to the present invention may perform effective semiconductor process management as the nozzle related information, the container settlement information, and the container related information are generated by each of the nozzle mounting unit 120 mounted on the chemical storage container 10 and the container settlement unit 130 on which the chemical storage container 10 is settled, and received and utilized by the monitoring management unit 200.

In particular, according to the present invention, the monitoring management unit 200 determines a movement path of the chemical storage container 10, and automatically determines an expiration date of the chemical storage container and whether to dispose the chemical storage container while preventing mixing of the nozzle cap 12, and fundamentally removes a process failure cause to significantly reduce total cost in a process operation process, and enhance productivity.

Hereinafter, other embodiments of the present invention will be described. In this case, in each embodiment to be described below, a duplicated description for the components similarly to the first embodiment will be omitted.

Figure 8:
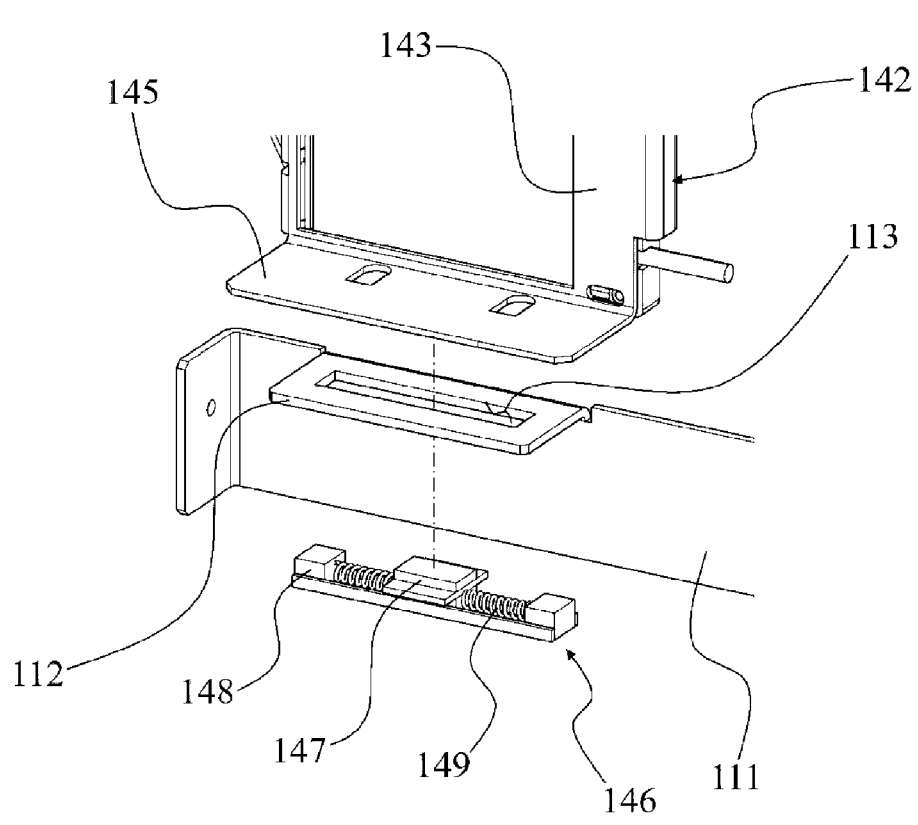
FIGS. 8 and 9 are diagrams illustrating a structure of a nozzle information acquisition unit in a chemical storage container management system for a semiconductor process according to a second embodiment of the present invention.
Figure 9:
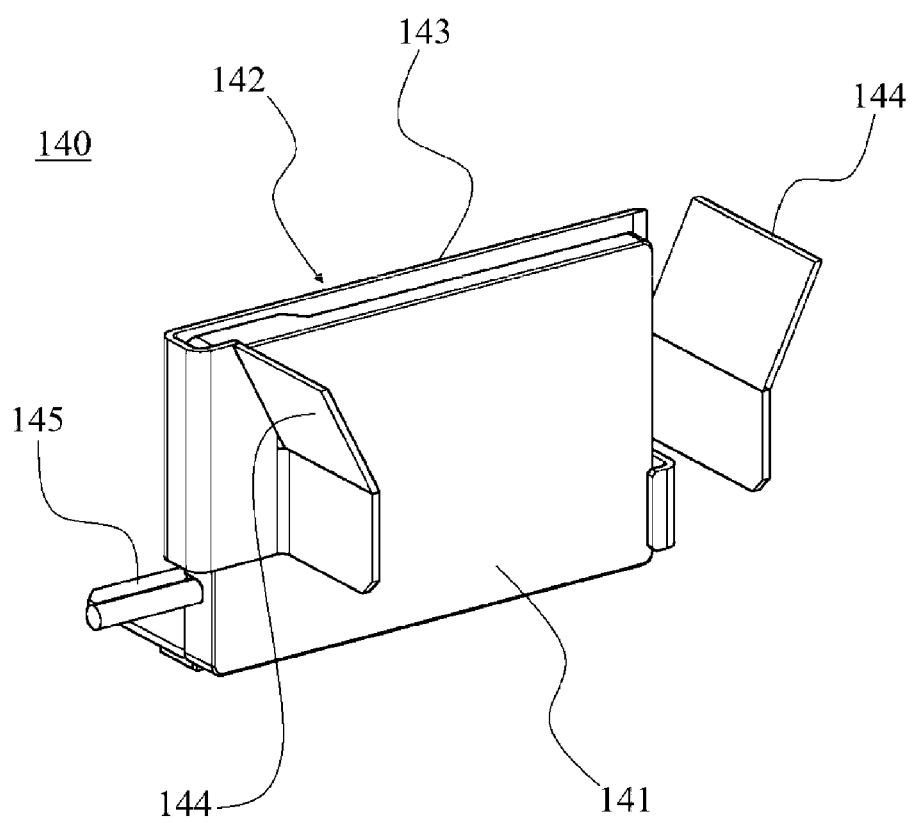

FIGS. 8 and 9 are diagrams illustrating a structure of a nozzle information acquisition unit 140 in a chemical storage container management system for a semiconductor process according to a second embodiment of the present invention.

In the second embodiment of the present invention illustrated in FIGS. 8 and 9, the nozzle information acquisition unit 140 includes the identification antenna 141 and the fixation bracket 142, and further, the fixation bracket 142 includes the rear surface fixation portion 143, a pair of guide portions 144, and the frame fastening portion 145, as in the first embodiment.

In addition, the nozzle information acquisition unit 140 of the embodiment additionally further includes a slide module 146 for horizontally moving the fixation bracket 142 in a predetermined range.

Specifically, in the embodiment, the frame fastening portion 145 of the fixation bracket 142 may be fixed to an upper side of a mount portion 112 provided in the upper frame 111 of the mount frame 110, and in this case, a connection slit 113 which penetrates long in a transverse direction may be formed at the mount portion 112.

In this case, the slide module 146 is formed to be provided at a lower side of the mount portion 112 and connected to the fixation bracket 142 through the connection slit 113.

In addition, in the embodiment, the slide module 146 may include a slide member 147, an elastic member 149, and a fixation member 148.

At least a part of the slide member 147 is connected to the frame fastening portion 145 of the fixation bracket 142 positioned at the upper side of the mounting portion 112 by penetrating the connection slit 113. Accordingly, the slide member 147 and the fixation bracket 142 may be formed to horizontally move in the transverse direction in a longitudinal direction of the connection slit 113.

Further, a pair of elastic members 149 are placed at both sides of the slide member 147, respectively.

In addition, a pair of fixation members 148 are also provided, and provided at lower portions of both sides of the frame fastening portions 146 of the fixation bracket 142, and as a result, a pair of fixation members 148 may fix outer portions of the elastic members 149 positioned in corresponding directions, respectively.

Meanwhile, as illustrated in FIG. 9, in the embodiment, a pair of guide portions 144 of the fixation bracket 142 are formed in a form in which a part of an upper portion is inclined, so the guide portions 144 are formed in a form in which the guide portions 144 are gradually widened outward from the lower portion to the upper portion.

According to the form of the nozzle information acquisition unit 140 of the embodiment, the process of settling the chemical storage container 10 on the chemical supply assembly 100 may be conducted as follows.

Figure 10:
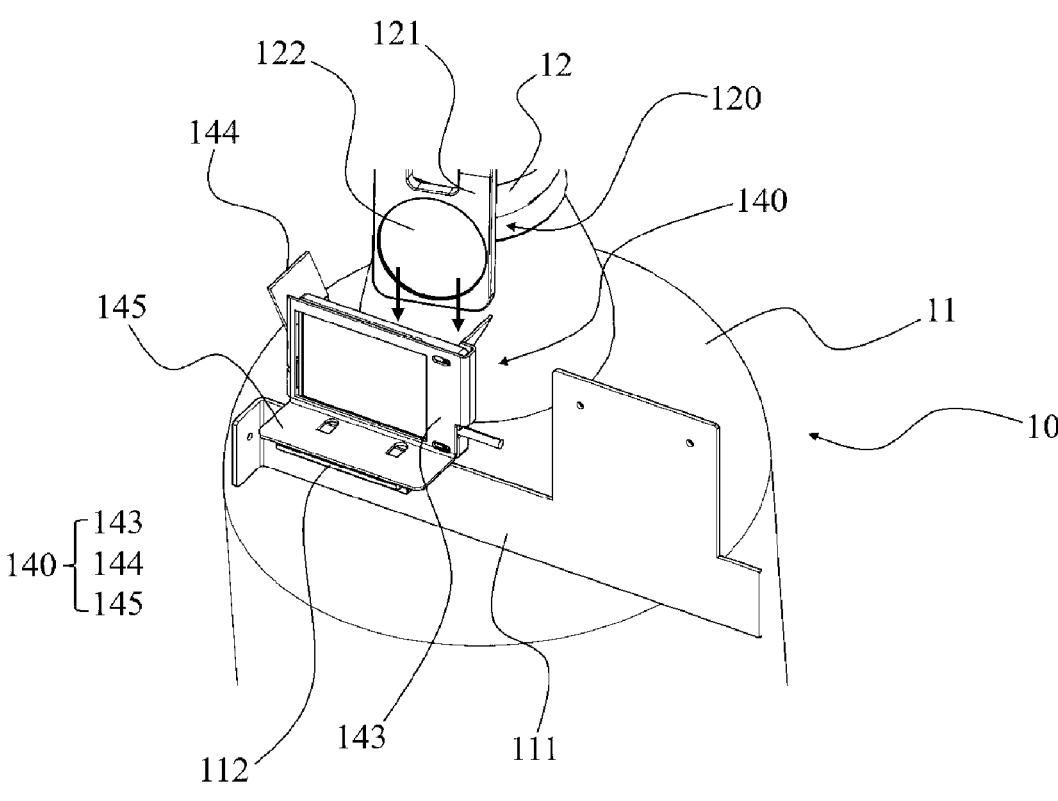
FIGS. 10 and 11 are diagrams illustrating a process of settling a chemical storage container on a chemical supply assembly in the chemical storage container management system for a semiconductor process according to the second embodiment of the present invention.
Figure 11:
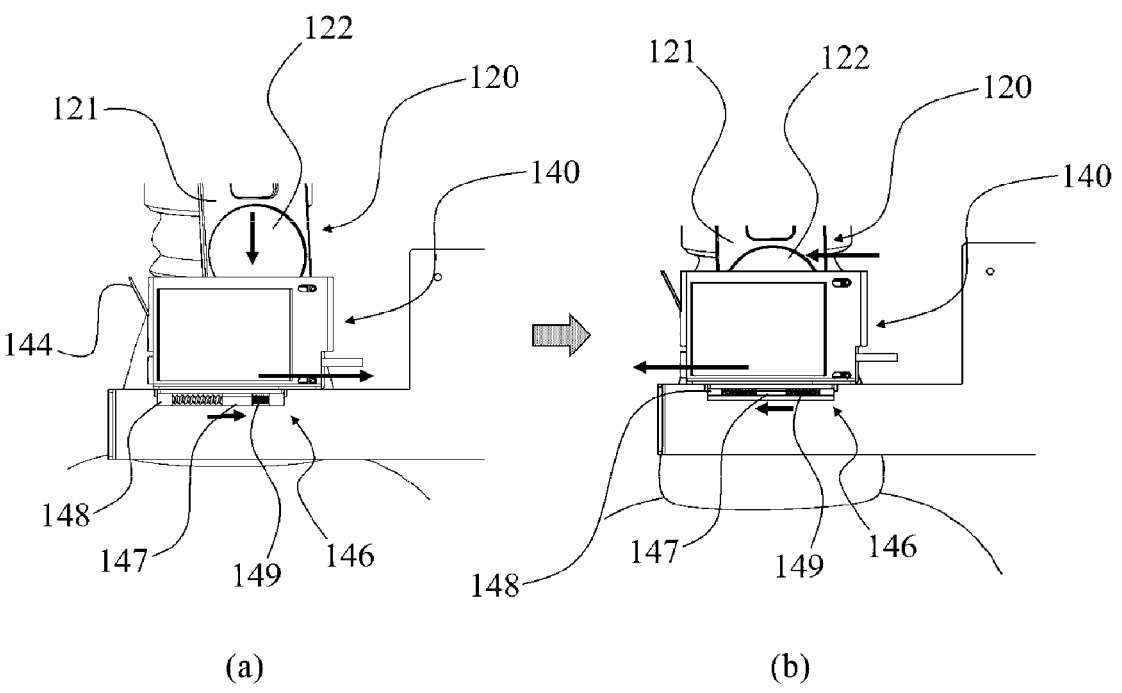

FIGS. 10 and 11 are a diagram illustrating a process of settling the chemical storage container 10 on the chemical supply assembly 100 in the chemical storage container management system for a semiconductor process according to the second embodiment of the present invention.

As illustrated in FIGS. 10 and 11, in the process of settling the chemical storage container 10 on the chemical supply assembly 100, the chemical storage container 10 may be introduced while being slightly rotated due to a mistake of an operator or an error of equipment. In such a case, the nozzle identification tag 122 provided in the nozzle mounting unit 120 is provided in skewed state without rightly facing the direction of nozzle information acquisition unit 140, there is a possibility that a recognition rate will deteriorate or a state in which recognition is impossible will be maintained.

However, since a part of the upper portion of a pair of guide portions 144 is formed to be inclined and the guide portions 144 are formed in the form of being gradually widened outward from the lower portion to the upper portion, the tag mounting portion 121 may be in contact with an inclined surface of the guide portion 144 when the chemical storage container 10 is introduced while being slightly rotated.

Accordingly, as illustrated in FIG. 11A, the fixation bracket 142 of the nozzle information acquisition unit 140 horizontally moves in a direction in which the guide portion 144 contacting the tag mounting portion 121 is positioned.

In this process, the elastic member 149 which is positioned in the direction in which the fixation bracket 142 horizontally moves between a pair of elastic member 149 provided in the slide module 146 is compressed by movement of the slide member 147 and the elastic member 149 positioned at an opposite side is released.

Thereafter, as illustrated in FIG. 11B, in a state in which the chemical storage container 10 is completely introduced into the chemical supply assembly 100, the fixation bracket 142 moves to an initial position again by restoration force of a pair of elastic members 149.

In addition, in this process, one guide portion 144 pushes the tag mounting portion 121 of the nozzle mounting unit 120, and as a result, the chemical storage container 10 is rotated as a whole and the nozzle identification tag 122 provided in the nozzle mounting unit 120 may have a corrected position so as to rightly face the direction of the nozzle information acquisition unit 140.

In this case, a pair of elastic members 149 provided in a pair of slide modules 146 may be provided in a state in which release force and compression force are balanced in a state in which the slide member 147 is positioned at the center.

Therefore, when the slide member 147 horizontally moves in any one direction, the slide member 147 receives the restoration force from both of a pair of elastic members 149 to apply more stronger pressing force to the nozzle mounting unit 120.

Figure 12:
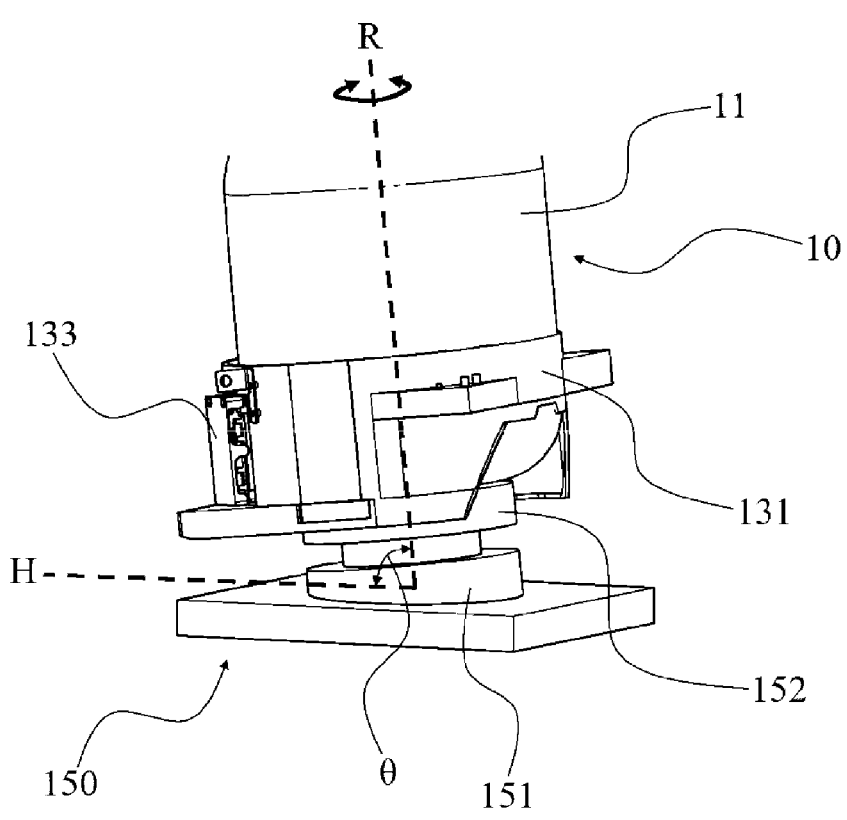
FIG. 12 is a diagram illustrating a structure of a container turning unit in a chemical storage container management system for a semiconductor process according to a third embodiment of the present invention.

FIG. 12 is a diagram illustrating a structure of a container turning unit 150 in the chemical storage container management system for a semiconductor process according to a third embodiment of the present invention.

It is premised that the third embodiment of the embodiment illustrated in FIG. 12 has the same components as the second embodiment as a whole, and the chemical supply assembly 100 additionally further includes the container turning unit 150.

The container turning unit 150 is positioned at the lower portion of the container settlement unit 130 to serve to support the lower portion of the chemical storage container 10.

Specifically, in the embodiment, the container turning unit 150 includes a base portion 151 provided in a fixed state and a rotating portion 152 formed to be rotatable based on a center point with respect to the base portion 151 and supporting the chemical storage container 10.

In this case, a rotational axis R of the rotating portion 152 is formed to coincide with a central axis of the chemical storage container 10, and as a result, the chemical storage container 10 may be smoothly rotated by minimizing frictional force applied to the chemical storage container 10 in the process of correcting the position of the nozzle identification tag 122.

In particular, in the embodiment, the chemical storage container 10 may be fixed to the chemical supply assembly 100 in a state in which the central axis is slightly inclined to the ground for smooth supply of the chemical, and as a result, the rotational axis R of the rotating portion 152 may also be inclined to a horizontal line H at the same angle θ.

In addition, to this end, a bottom surface of the base portion 151 may be formed parallel to the horizontal line H and be in contact with the ground, and a top surface is formed to be inclined vertically to the rotational axis R of the rotating portion 152 to smoothly rotate the rotating portion 152.

A preferred embodiment of the present invention has been described as above and a fact that the present invention can be materialized in other specific forms without departing from the gist or scope in addition to the embodiment described above is apparent to those skilled in the art. Therefore, the aforementioned embodiment is not limited but should be considered to be illustrative, and as a result, the present invention is not limited to the above description and may be modified within the scope of the appended claims and a range equivalent thereto.

What is claimed is:

1. A chemical storage container management system for a semiconductor process, comprising:
   a chemical supply assembly supplying a chemical accommodated in a chemical storage container accommodating the chemical used for the semiconductor process to a region in which the semiconductor process is performed, and generating a plurality of information related to the chemical storage container; and
   a monitoring management unit receiving the plurality of information generated by the chemical supply assembly, and determining an operation situation of the chemical supply assembly,
   wherein the chemical supply assembly includes:
   a nozzle mounting unit provided detachably on the chemical storage container, and including a nozzle identification tag storing nozzle related information of the chemical storage container;
   a container settlement unit provided so as to settle the chemical storage container therein, and acquiring container settlement information indicating whether the chemical storage container is settled and container related information from a container identification tag pre-mounted on the chemical storage container through short-range wireless communication; and
   a nozzle information acquisition unit acquiring the nozzle related information from the nozzle identification tag and transmitting the nozzle related information to the container settlement unit through the short-range wireless communication.

2. The chemical storage container management system for a semiconductor process of claim 1, wherein the nozzle mounting unit comprises:
   a first nozzle mounting part covering at least a partial circumference of the chemical storage container and having the nozzle identification tag; and
   a second nozzle mounting part coupled to the first nozzle mounting part in a form to cover the remaining circumference of the chemical storage container.

3. The chemical storage container management system for a semiconductor process of claim 1, wherein the container settlement unit comprises:

a container holder having a settlement space on which the settlement storage container is settled therein; and a communication board provided in the container holder, and generating container settlement information as recognizing whether the chemical storage container is positioned in the settlement space, and acquiring the container related information and the nozzle related information, and transmitting the acquired information to the monitoring management unit.

4. The chemical storage container management system for a semiconductor process of claim 1, wherein the nozzle information acquisition unit comprises:

an identification antenna identifying the nozzle identification tag and acquiring the nozzle related information, and transmitting the nozzle related information to the container settlement unit; and a fixation bracket fixing the identification antenna.

5. The chemical storage container management system for a semiconductor process of claim 1, wherein the chemical supply assembly further comprises a mount frame, and the mount frame is provided with a plurality of nozzle information acquisition units and a plurality of container settlement units to match each other one by one, and the chemical supply assembly is formed to introduce a plurality of chemical storage containers.

6. The chemical storage container management system for a semiconductor process of claim 5, further comprising:

a gateway distinguishing the container settlement information, the container related information, and the nozzle related information from the plurality of nozzle information acquisition units and the plurality of container settlement units, and individually transmitting the distinguished information to the monitoring management unit, and distinguishing wireless communication host protocol information generated by the monitoring management unit and individually transmitting the wireless communication host protocol information to the plurality of nozzle information acquisition units and the plurality of container settlement units.

7. The chemical storage container management system for a semiconductor process of claim 1, further comprising a pre-checker terminal receiving the container settlement information, and monitoring a current status and an error occurrence situation for a process of loading/unloading the chemical storage container on/from the container settlement unit.

8. The chemical storage container management system for a semiconductor process of claim 7, wherein the pre-checker terminal comprises an alarm unit generating an alarm in the process of loading/unloading the chemical storage container on/from the container settlement unit by receiving the container settlement information.

9. The chemical storage container management system for a semiconductor process of claim 1, further comprising:

a sound generation apparatus performing an alarm by regenerating a sound by a control command of the monitoring management unit when the monitoring management unit determines that a predetermined error situation occurs with respect to the chemical supply assembly.

* * * * *